Jan. 31, 1939.  P. J. MILLER ET AL  2,145,452
VEHICLE VENTILATING AND CONTROL APPARATUS
Filed Nov. 20, 1936　　2 Sheets-Sheet 1
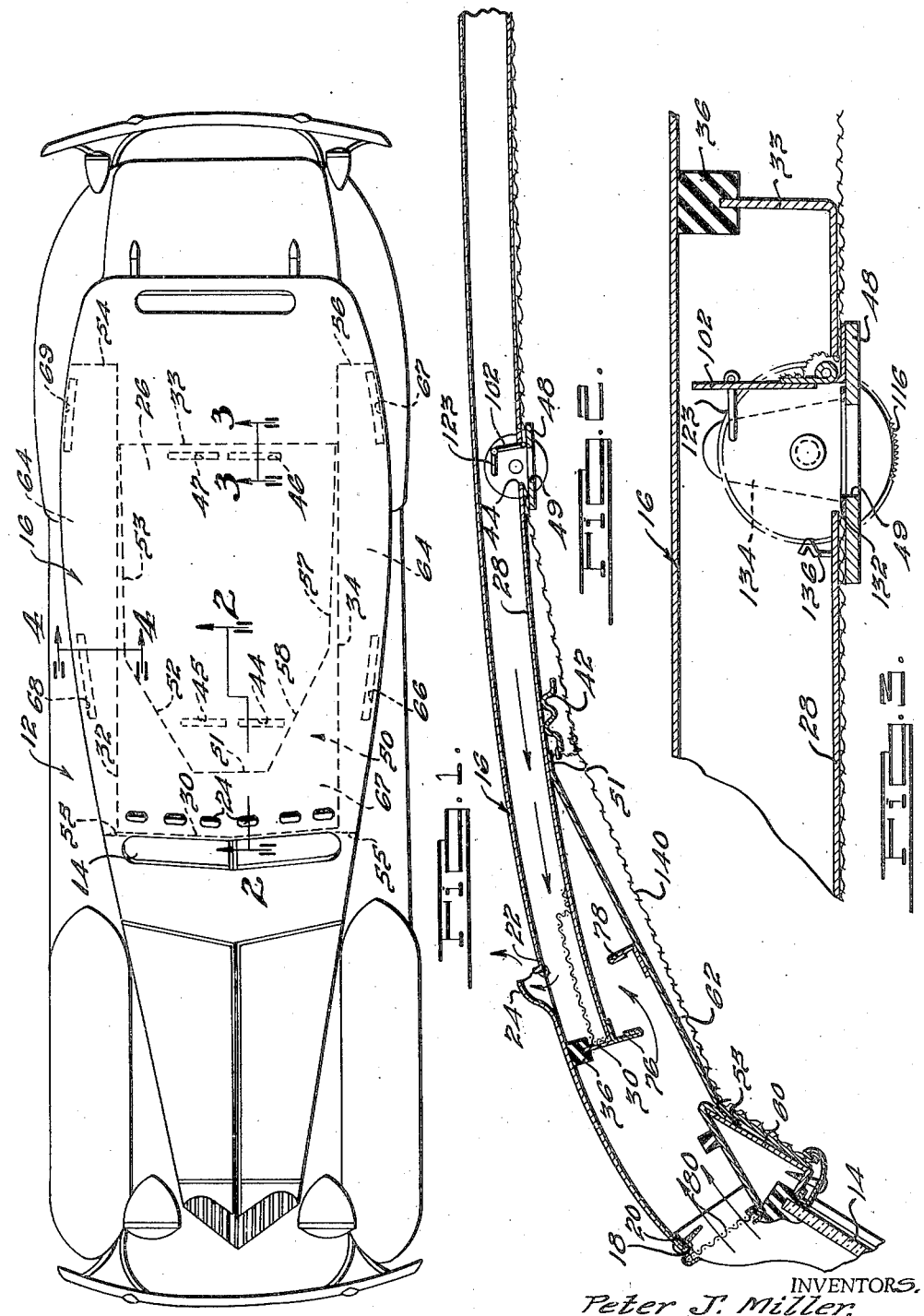
INVENTORS.
Peter J. Miller,
Richard C. Spooner.
BY
Barnes, Dickey, Pierce & Hann
ATTORNEYS.

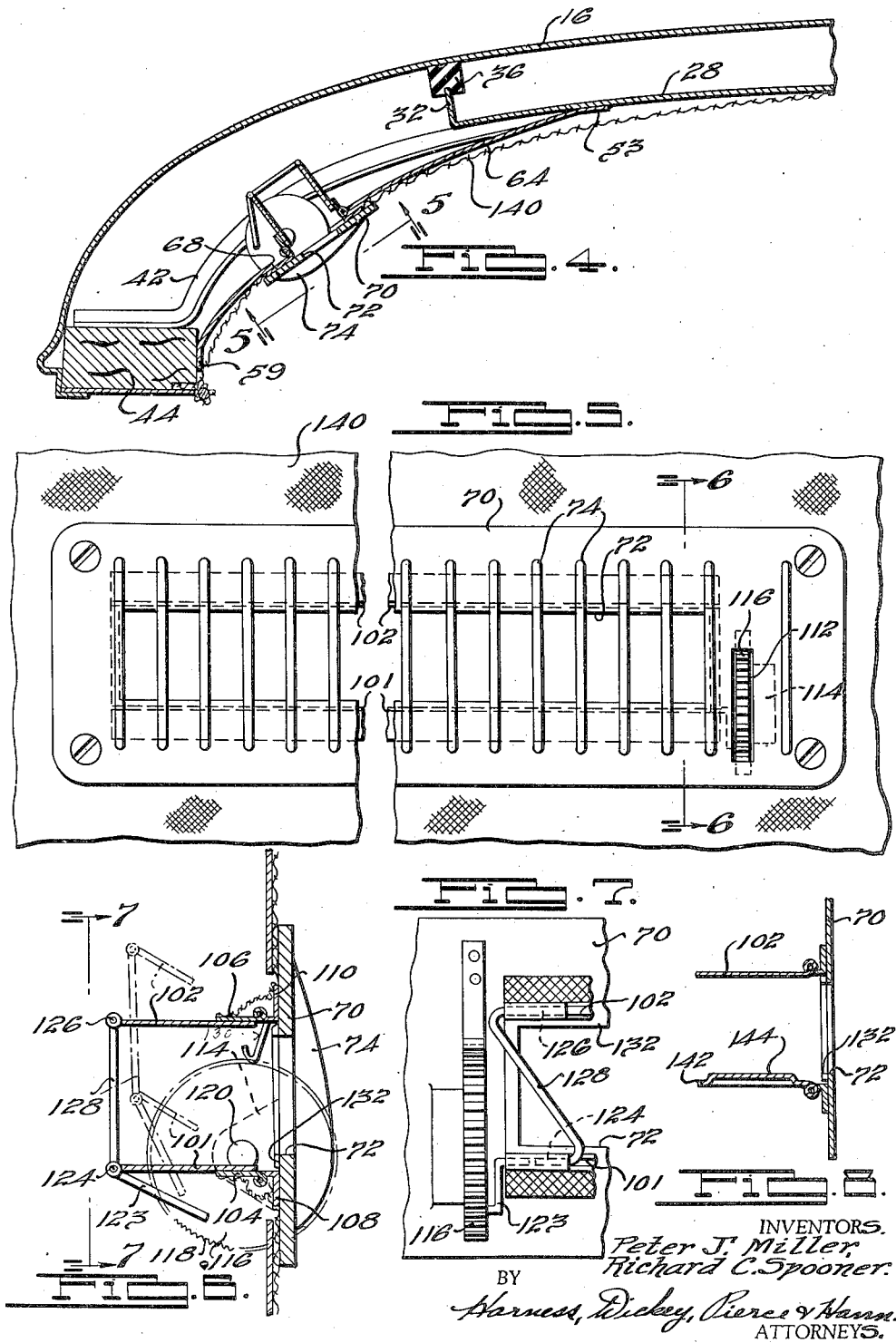

Patented Jan. 31, 1939

2,145,452

UNITED STATES PATENT OFFICE 2,145,452

VEHICLE VENTILATING AND CONTROL APPARATUS

Peter J. Miller and Richard C. Spooner, Detroit, Mich., assignors to Evans Products Company, Detroit, Mich., a corporation of Delaware Application November 20, 1936, Serial No. 111,772

3 Claims. (Cl. 98—2)

This invention relates to vehicle body ventilating apparatus and, in particular, relates to apparatus for ventilating the interior of a closed passenger vehicle.

Objects of the invention are to provide improved air flow control means for controlling the flow of air into or out of an air conduit; to provide an improved ventilating structure by which the air injected into or ejected from the passenger compartment of a vehicle may be more effectively and efficiently distributed; to provide, in association with the outlet or inlet of air conduits which communicate with the passenger compartment of a vehicle, an improved control mechanism which is readily accessible to the occupants of the vehicle; to provide, in association with the outlet of an air inlet conduit, an improved flow control means by which both the direction an amount of air flowing through the outlet may be controlled; and to provide a simplified air flow control means which may be economically installed in ventilating structures.

Other objects of the invention will become apparent from the following specification, the drawings relating thereto and from the claims hereinafter set forth.

In the drawings, in which like numerals are used to designate like parts in the several views throughout;

Figure 1 is a top plan view of a vehicle embodying features of the present invention;

Fig. 2 is a cross-sectional view taken substantially along the line 2—2 of Fig. 1;

Fig. 3 is a cross sectional view taken substantially along the line 3—3 of Fig. 1;

Fig. 4 is a cross-sectional view taken substantially along the line 4—4 of Fig. 1;

Fig. 5 is a broken view taken substantially in the direction of the arrows 5—5 of Fig. 4;

Fig. 6 is a cross-sectional view taken substantially along the line 6—6 of Fig. 5;

Fig. 7 is a view taken substantially in the direction of the arrows 7—7 of Fig. 6; and Fig. 8 is a modification of the structure shown in Figs. 6 and 7.

The present invention relates to structures such as those shown in United States Letters Patent No. 1,969,934 granted August 14, 1934, to William Lintern and Alfred B. Lintern and shown in the United States Letters Patent No. 2,036,485 granted April 7, 1936, to William Lintern and Alfred R. Lintern. In the patents referred to, structures are disclosed in which air is injected into the body of a vehicle and ejected from the body for the purpose of maintaining the interior of the body in a properly ventilated condition.

Also, the present application is a companion case to the copending application of Alfred R. Lintern, Serial No. 111,786, filed November 20, 1936.

According to the broader aspects of the present invention, improved means are provided for controlling the flow of air through an air conduit. The control means of the present invention are particularly adapted for use with structures for ventilating the interior of closed passenger vehicles and are so illustrated in the present application.

According to the structure to which the present invention particularly relates, an injector opening, or openings, is provided immediately above the windshield, and ejector openings are provided in the outer roof panel of the vehicle in a position above the windshield and adjacent the front of the vehicle top. Intake and exhaust chambers communicating with the injector and ejector openings respectively, are formed in the vehicle roof in a simplified manner. The exhaust chamber is preferably formed by a sheet metal pan member which extends longitudinally of the vehicle substantially co-extensive with the upper roof portion in cooperation with the outer roof panel. The intake chamber is preferably formed of a single sheet metal member having side portions which extend longitudinally of the vehicle adjacent the side portions of the roof and cooperate with the outer roof panel to form the chamber. Openings communicating with the passenger compartment of the vehicle are provided in the two members communicating with the front and rear portions of the passenger compartment for proper and adequate air distribution. Means are also provided in association with these openings to diffuse the air injected into the vehicle so that objectionable drafts are eliminated.

For a better understanding of the invention, reference may be had to the accompanying drawings in which a preferred structure is illustrated, and in which in Fig. 1 a passenger automobile 12 of the closed type is illustrated embodying features of the present invention. The automobile 12 includes a conventional front windshield 14 and a conventional roof having a curved outer roof panel 16.

The outer roof panel 16 extends forwardly of the front windshield adjacent the front edge 18 and is provided with a transverse opening 20, or openings, providing an injector or intake opening for air. The air as it passes upwardly over the windshield is caught by the forwardly extending edge 18 of the outer roof panel and is caused to pass into the vehicle through the opening 20.

A plurality of ejector openings 22 are provided through the outer roof panel transversely thereof above the windshield and adjacent the forward edge of the outer roof panel. Louvres 24 are preferably provided over the openings 22. As disclosed in the above referred to patents, and as disclosed in the United States Letters Patent No. 1,862,058 granted June 7, 1932, to William Lintern, the openings 22 are located in such a position relative to the vehicle roof that a low pressure is created immediately above the openings causing ejection of air from the interior of the passenger vehicle.

In order to provide an exhaust chamber, or air conduit, in communication with the exhaust openings 22, a unitary pan member 26, which is preferably substantially rectangular in shape, is provided having a bottom 28 and upstanding sides 30, 32, 33 and 34. Elongated resilient members 36 have portions which embrace the upper edges of the side members and are adapted to resiliently engage the inner surface of the outer panel member 16 around the periphery of the pan member 26 to provide an air-tight seal for the exhaust chamber. The pan member 26 extends longitudinally of the roof of the vehicle substantially coextensive with the top portion of the roof; and the bottom and sides of the pan member are preferably curved complementary in shape to the curvature of the roof so that a sealed fit is effected.

The pan member 26 is supported and held in place relative to the roof by means of a transversely extending corrugated bracket member 42 suitably secured to the longitudinally extending lintel members 44 at the sides of the vehicle. The pan member may be spot welded to the bracket member 42 or otherwise suitably secured thereto.

For communicating the exhaust chamber with the passenger compartment of the vehicle, two pairs of transversely extending openings 44, 45, 46 and 47 are provided through the bottom 28. The openings 44 and 45 are intermediate the ends of the pan member so that these openings communicate with the forward portion of the passenger compartment; and the openings 46 and 47 are located adjacent the rear of the pan member so that these openings communicate with the rear portion of the passenger compartment. Although in the specific embodiment shown, two openings are illustrated communicating with the front portion of the passenger compartment and two openings are illustrated communicating with the rear portion thereof, it is to be understood that this number of openings may be varied within the scope of the present invention and that the particular number shown is merely by way of illustration.

Grill members 48 are preferably provided over the openings 44, 45, 46 and 47 respectively, on the interior of the vehicle, the grill members 48 having openings 49 therethrough in alignment with the openings into the exhaust chamber for communicating the exhaust chamber with the passenger compartment. Suitable control means are also provided for adjustably controlling the flow of air through the openings and the particular type of control mechanism will hereinafter be described in detail.

For the purpose of controlling the direction of flow and distribution of the fresh air injected into the vehicle through the opening 20, a unitary sheet metal member 50 of a shape defined by edges 51, 52, 53, 54, 55, 56, 57 and 58 in Fig. 1, is provided and mounted within the roof of the vehicle in the manner to be described in detail. Those edges of the sheet metal member connecting the edges 54 and 55 and 55 and 56 respectively, are indicated at 59 in Fig. 4.

The front edge 55 of the member 50 is suitably secured to the upper frame structure 60 of the vehicle transversely of the opening 20; and the side edges 59 of the member 50 are suitably secured to the longitudinally extending lintel members 44. The edges 51, 52, the greater portion of 53, 58, and the greater portion of 57 are suitably secured to the under surface of the bottom 28 of the pan member 26, and the remaining portions of the edges of the member 50 are suitably secured to the upper roof panel. The connections between the edges of the member 50 and the vehicle body and pan member are substantially air-tight so that the space between the member 50 and the roof panel is separated from the interior of the vehicle and air cannot penetrate into the passenger compartment except by the control means which are to be described hereinafter.

Referring particularly to Figs. 1, 2 and 4, it can be seen that the member 50 in its association with the other members above described, forms an air injector chamber, or conduit, having a transverse front portion in communication with the injector opening 20 and having side portions which extend longitudinally of the vehicle at each side thereof substantially co-extensive with the side portions of the vehicle roof. The sheet member 50 may be described as having a transverse front portion 62 with longitudinally extending side portions 64, the portion 62 sloping downwardly and forwardly and the side portions 64 sloping downwardly and outwardly as indicated in Figs. 2 and 4. The side portions 64 may be curved as indicated in Fig. 4 so that the usual interior appearance of the vehicle is not disturbed.

Longitudinally extending openings 66, 67, 68 and 69 are provided through the side portions 64 of the member 50 for communicating the injector or intake openings with the passenger compartment. In the embodiment illustrated, two spaced openings are provided at each side of the vehicle so that air introduced into the interior of the vehicle may be properly distributed, but it is to be understood that this number may be varied as desired within the scope of the present invention.

Grill members 70 having openings 72 therethrough in alignment with the openings 66, 67, 68 and 69 respectively, are provided; and transversely extending fins 74 are provided across the opening 72 for the purpose of diffusing the air entering the passenger compartment and thus preventing objectionable drafts. Control means are also provided for adjustably controlling the direction and flow of air through the openings 72, the particular type of control means illustrated to be described in detail hereinafter.

In order to break up the incoming stream of air into the intake chamber, transversely extending baffles 76 and 78 are provided at the forward portions of the member 50. The baffle member 76 may be suitably secured to the front edge of the bottom 28 of the pan member 26 and directed downwardly; and the baffle 78 may be suitably secured to the member 62 and directed upwardly in a rearwardly spaced position from the baffle 76. It can thus be seen that air entering the intake chamber is caused to strike against the baffles 76 and 78 and any moisture contained therein will be separated therefrom and prevented from entering the passenger compartment.

Screen members 80 are also preferably mounted within the intake opening 20 to prevent the passage of foreign material into the intake chamber.

The present invention is directed particularly to the means which are provided for controlling the flow of air through the exhaust and intake openings into the passenger compartment; and these means comprise, in general, upstanding plate, or shutter, members hingedly mounted above the openings into the passenger compartment with means accessible from the passenger compartment to adjustably position the shutters relative to the openings.

The detailed structure for controlling the flow of air into the passenger compartment through the intake openings is particularly shown in Figs. 4 to 8 and reference may be had to these figures for the detailed structure. Mounted within each of the openings 66, 67, 68 and 69 and projecting therethrough into the intake chamber are two elongated plate or shutter members 101 and 102. Each of the members 101 and 102 is suitably secured to the hinges 104 and 106 respectively, the hinges 104 and 106 being flanged outwardly at 108 and 110 respectively. The portions 108 and 110 of the hinges are suitably secured, as by welding, for example, to the inner surface of the grill member 70 slightly inwardly displaced from the edges of the opening 72. An opening 112 is provided through the grill 70 at one end of the opening 72 and an upstanding bracket member 114 is suitably secured to the inside face of the grill 70 adjacent the outermost side of the slot 112 preferably offset to one side of the transverse center of the opening 72. A thumb wheel 116 having transverse grooves around its periphery is rotatably mounted on the bracket member 114 by means of shaft 120. Referring particularly to Fig. 6, it can be seen that with this construction and arrangement, the lower portion of the wheel projects to a slight extent through the slot 112 and is adapted to be engaged for rotation by one of the occupants of the vehicle.

A wire member 122 is pivotally secured to the wheel 116 adjacent the outer periphery thereof and is bent to form a crank arm 123 and then bent inwardly, as best shown in Fig. 7; and the inwardly bent portion is suitably pivotally connected to the upper edge of the shutter member 101 adjacent one end thereof. Another wire member has two substantially parallel transverse portions 124 and 126, the opposite ends of which are connected together by the cross portion 128. The portions 124 and 126 are suitably pivotally connected to the upper ends of members 101 and 102 adjacent one end thereof. It is evident then that, upon rotation of the wheel 116, the wire member 122 causes pivoting of the members 101 and 102 as indicated by the broken lines in Fig. 6.

By tilting the members 101 and 102 in the direction desired, the direction of the air entering the passenger vehicle through the opening 72 may be effectively controlled.

In order to adjustably hold the members 101 and 102 in the position desired, an elongated spring member 130 is suitably secured at one end to the rear face of the grill 70 and at its other end, resiliently bears against the outer periphery of the wheel 118 as indicated in Figs. 6 and 7.

The members 101 and 102 may be tilted to the position desired, as pointed out above, to control the direction of flow of air into the passenger compartment; or by still further rotation of the wheel, the members 101 and 102 may be positioned to completely close the opening 72. In order to provide a tight seal for this opening, a member 132 preferably of resilient material such as sponge rubber, is provided around the edge of the opening 72 so that, when in closed position, the member 101 or 102 resiliently bears against this member 132 and seals the opening.

In Fig. 8 a modified structure is illustrated in which one of the members 101 or 102 is replaced by a shutter member 142 having an offset portion 114 substantially the shape of the opening 72. The offset portion 144 is adapted to seat within the opening 72 and snugly bear against the resilient sealing members 132 to seal the opening when the shutter is in its closed position.

For controlling the flow of air outwardly through the exhaust openings, an operating means substantially the same as for the intake control shutters is provided and, by referring to Figs. 2 and 3, it can be seen that a single plate or shutter member 102 is used and is connected to the thumb wheel 116 by a wire member having a crank arm 123 adjacent the outer periphery of the wheel. The crank arm 123 is preferably pivotally attached to the member 102 inwardly from the upper edge thereof.

In the structure for controlling the exhaust shutter 102, the wheel 116 is rotatably mounted on an upstanding bracket member 134 which is located at one end of the opening 49 substantially at the transverse center of the opening. A spring 136 is suitably secured to the bottom 28 of the pan member 26 and resiliently bears against the outer periphery of the wheel 116 to hold it in its adjusted position.

By referring to Figs. 2 and 3, it can be seen that, upon rotation of the wheel 116, the shutter plate 102 may be moved to a closed position to close the opening 49 and resiliently bears against a resilient member 132 to seal the opening.

It is evident from the above description and from the drawings that the control shutters and the operating mechanisms therefor are mounted on their respective grills so that the grill, shutter controls, and operating mechanisms may be installed as a unit in the intake and exhaust openings.

It is also evident from the above description and from the drawings that by suitable control of the intake and exhaust shutters the amount and direction of the flow of air into the passenger compartment for the various intake openings may be effectively controlled and that the amount of air exhausted from the different portions of the passenger compartment may be controlled as desired. By suitably setting the control mechanism as desired, the passengers may easily and effectively control the ventilation of the passenger compartment.

In order to finish the interior appearance of the vehicle, head lining 140 having openings therethrough corresponding to the intake and exhaust openings in the passenger compartment is fixed in place within the passenger compartment in the usual manner.

Formal changes may be made in the specific embodiments of the invention described without departing from the spirit and substance of the broad invention, the scope of which is commensurate with the appended claims.

What is claimed is:

1. Apparatus for ventilating the interior of a closed vehicle body comprising means forming an air inlet conduit, said conduit having an opening therethrough communicating with the interior of said body, and means to control the flow of air through said opening, said last named means including shutter members, said shutter members being pivotally mounted adjacent opposite sides of said opening, a thumb wheel rotatably mounted in a plane transverse to the plane of said shutter members, a crank arm pivotally connected to said wheel and to one of said shutter members, and means pivotally connecting said shutter members.

2. Apparatus for ventilating the interior of a closed vehicle body comprising means forming an air inlet conduit, said conduit having an elongated opening therethrough communicating with the interior of said body, and means to control the flow of air through said opening, said last named means including elongated shutter members, one of said shutter members being pivotally mounted adjacent each of the longitudinal edges of said elongated opening, a thumb wheel rotatably mounted in a plane transverse to the plane of said shutter members adjacent one end of said shutter members, a crank arm pivotally connected to said wheel adjacent the outer periphery thereof and pivotally connected to one of said shutter members adjacent the outer edge thereof, and means pivotally connected to the outer edges of said shutter members, the construction and arrangement being such that upon rotation of said wheel said shutter member will be caused to pivot while maintaining a parallel relationship with respect to each other.

3. Apparatus for ventilating the interior of a closed vehicle body comprising means forming an air inlet conduit, said conduit having an elongated opening therethrough communicating with the interior of said body, and means to control the flow of air through said opening, said last named means including an elongated grille member having a longitudinally extending opening therethrough in alignment with said elongated opening and having a transversely extending aperture therethrough adjacent one end of said longitudinal opening, elongated shutter members, one of said shutter members being pivotally mounted along one edge thereof to said grille member adjacent each longitudinally extending edge of said elongated opening, a thumb wheel rotatably mounted on said grille member adjacent one end of said shutter members, a portion of said wheel extending through said elongated aperture, a crank arm pivotally connected to said wheel adjacent the outer periphery thereof and pivotally connected to one of said shutter members, and means pivotally connected to each of said shutter members.

PETER J. MILLER.
RICHARD C. SPOONER.